United States Patent Office 3,094,137
Patented June 18, 1963

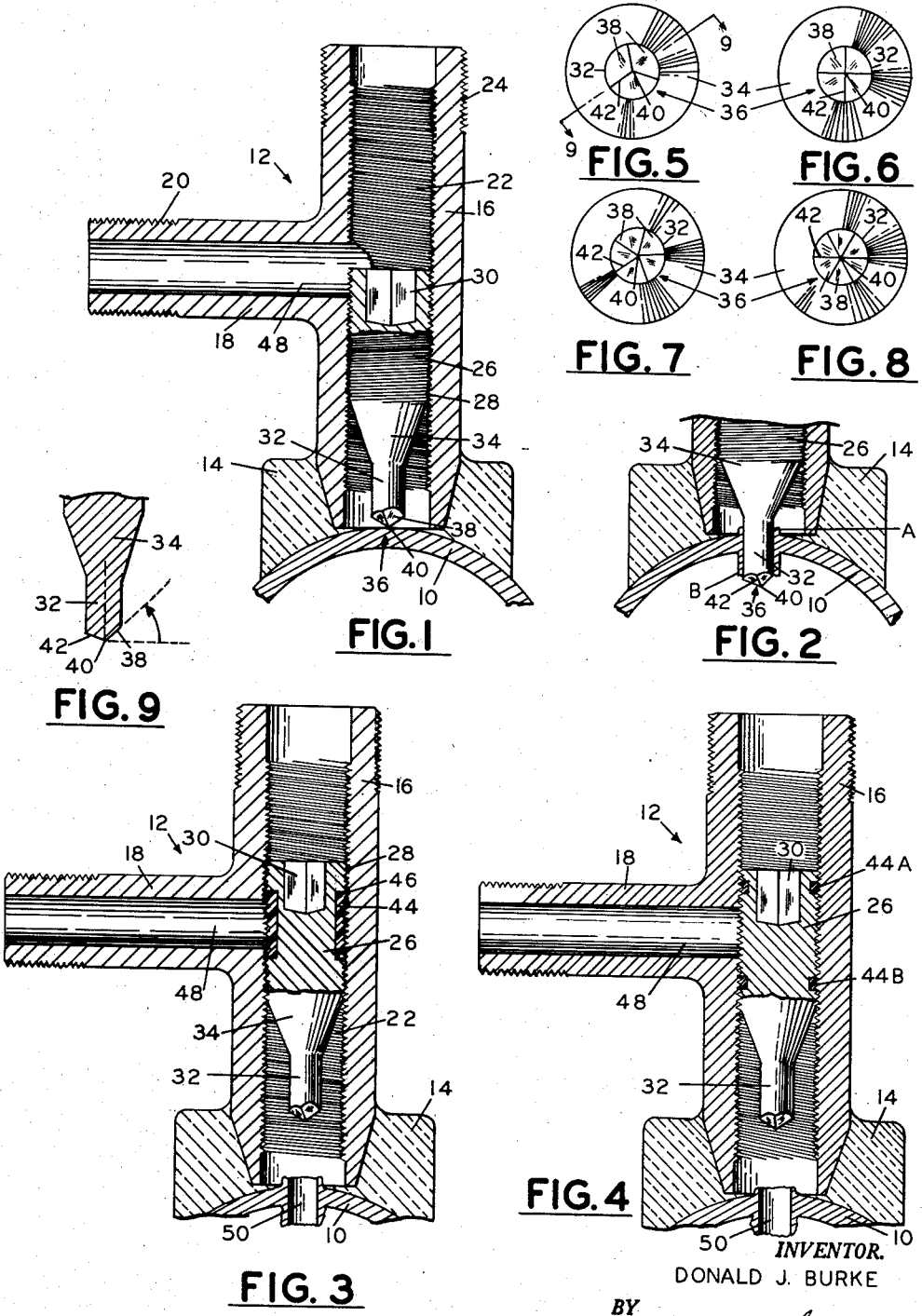

3,094,137
SELF-PUNCHING T FITTINGS
Donald J. Burke, 4530 S. Jamestown, Tulsa, Okla.
Filed Jan. 9, 1961, Ser. No. 81,347
2 Claims. (Cl. 137—318)

This invention relates to improvements in self-punching T fittings. More particularly, the invention relates to improvements in self-punching T-fittings of a type adaptable for welding to a pipe wherein the punching operation produces neither a metal slug nor metal chips to contaminate the interior of the pipe in the process of forming the hole. In another aspect of the invention improvements are provided whereby a self-punching T fitting may be used to provide a tap fitting to a high pressure gas line and including means whereby a hole may be drilled in the line without the danger of escaping gas.

It is frequently necessary to tap gas lines under pressure to provide a means of conducting gas away from the line at a point where no previous provision for tapping to the line has been made. In order to obviate the necessity of closing down the line, that is completely shutting off the gas pressure from the line while a tap is being made, a method has been developed to tap the line while the line is under pressure. Utilizing this method a tubular, internally threaded body member is welded substantially radially of the pipe. An integrally formed tubular T member intersects the body member and provides means whereby connection is made with other pipes, valves, or fittings so that gas may be conducted away from the line. A cylindrical externally threaded punch member is screwably positioned within the tubular body member. A punch face is provided on the punch member whereby rotation of the punch member in one direction engages the punch face with the pipe and punches a hole in the pipe. After formation of the hole in the pipe the punch member is withdrawn by rotation in the opposite direction so that communication is provided between the interior of the pipe through the body member to the tubular T member. This procedure has many applications and has found commercial usage.

There are certain difficulties however which up to the present time have contributed to a more or less limited commercial application of the self-punching T fitting. One method of forming a hole in the pipe following the welding of the body member to the pipe includes the use of a drill which fits closely to the interior of the body member and which serves to limit the amount of gas or other liquids which escape when the hole is drilled through the pipe. This system, although achieving some success, has a primary disadvantage in that as the hole is drilled through the pipe a great amount of metallic shavings which are formed in the drilling process fall directly into the interior of the pipe. These metallic shavings constitute a source of trouble in the operation of the pipeline since they tend to accumulate in small restrictions such as in valves, meters, gas jets and so forth.

To eliminate this difficulty, others have suggested the use of a punching device having an oblique end face adaptable for rotation under pressure against the pipe whereby a portion of the pipe, usually termed a slug, is forced out of the pipe wall and falls into the pipe interior. This system eliminates the difficulty of the metallic chips being formed in the drilling process but results in an equally disadvantageous result, that is, the deposit of a metallic slug in the pipe.

An additional disadvantage in present devices is overcome by this invention. When a self-punching T fitting of a type presently available is used to provide a tap connection to a high pressure gas line a hazard arises in that as soon as the punch forms a hole so that communication between the interior of the gas line and the T fitting occurs, gas pressure causes gas to pass between the threads of the punching member and the internal threads of the T body member and directly towards the operator of the device. This, of course, represents a great safety hazard in that any gas accumulation can potentially result in a serious explosion or a fire.

This invention may be described as improvements in self-punching T fittings. More particularly, but not by way of limitation, this invention may be described as a self-punching T fitting adaptable for affixing to a pipe whereby fluid communication may be provided with said pipe, comprising, in combination: a tubular body member adaptable for affixing, as by exothermic welding, at one end thereof to the exterior surface of said pipe whereby said body member extends substantially radially therefrom, said tubular body member having threads formed substantially the full length of the internal surface thereof; a tubular T member engaging and integrally formed with said body member intermediate the ends thereof whereby the interior of said tubular T member communicates with the interior of said body member; and a cylindrical punching member having threads formed thereon adaptable to screwably engage said internal threads of said body member, said punch member having a reduced concentric cylindrical end portion, said reduced end portion terminating in a punching face, said punching face defined by at least three flat face areas formed at an angle with respect to a plane drawn perpendicular to the axis of said punching member, said flat face areas intersecting each other to form a point coinciding with the axis of said cylindrical punch member, and said punch member having means at the end opposite said punching face adaptable to receive a tool whereby said punch member may be rotated in one direction to engage said punching face with said pipe to displace a portion of the metal of said pipe to form a hole therein and whereby said punching member may be subsequently rotated in the opposite direction to displace said punching member within said body member away from said hole to provide fluid communication between said pipe and said tubular T member.

It is one object of this invention to provide a sealing means between the punching member and the interior threaded tubular body member of a self-punching T fitting to prevent the possibility of the escape of gas as a hole is drilled into a high pressure gas line.

Another object of this invention is to provide a self-punching T fitting for use in conjunction with gas lines, including a punching means actuatable within the T fitting for producing a hole in the line to which the T fitting has been previously welded and wherein the punching operation which produces the hole in the line results neither in the formation of metallic chips nor in the formation of a slug to contaminate the interior of the line.

These and other objects and a better understanding of the invention may be had by referring to the following description and claims, taken in conjunction with the attached drawing, in which:

FIGURE 1 is a cross-sectional view of a self-punching T fitting according to the principles of this invention showing the T fitting after having been welded to a line or pipe and ready for the punching of a hole into the pipe.

FIGURE 2 is a partial cross-sectional view of the device of FIGURE 1 showing the manner in which a hole is formed in the pipe by the novel configuration of the punching face of this invention.

FIGURE 3 is a cross-sectional view of the self-punching T fitting of this invention welded to a pipe and showing the provision of a gasket between the punching member and the interior wall of the tubular body member whereby escape of gas past the punching member is prevented.

FIGURE 4 is a cross-sectional view similar to that of FIGURE 3 showing an alternate embodiment whereby the escape of gas past the punching member of the device is prevented.

FIGURE 5 is an end view of the punching member of this invention showing an embodiment wherein three flat faces are provided to form the punching face.

FIGURE 6 is an end view of the punching member of this invention showing an embodiment wherein four flat faces are provided on the punching face.

FIGURE 7 is an end view of an alternate embodiment of the punching member of this invention showing the provision of five flat faces on the punching face.

FIGURE 8 is an end view of an alternate embodiment of the punching member of this invention showing the provision of six flat faces on the punching face.

FIGURE 9 is a cross-sectional view of the punch portion taken along the line 9—9 of FIGURE 5 showing the angle the flat faces of the punching face form with the axis of the cylindrical punch member.

Referring now to FIGURE 1 a pipe 10, which is part of a gas line, is shown to which has been welded a self-punching T fitting, indicated generally by the numeral 12. The self-punching T fitting 12 is welded to pipe 10, in this example, as by the exothermic welding process wherein solidified weld metal 14 is deposited around the T fitting 12. This is by way of example only as the invention disclosed herein may be equally applied to T fittings which are welded to pipe 10 by electric welding or any other type of welding process. The self-punching T fitting 12, including the improvements of this invention, may also be applied to fittings affixed to pipes by a clamping process.

The self-punching T fitting 12 is comprised basically of an upright tubular body member 16 having an integrally formed intersecting tubular T member 18. Tubular T member 18 communicates with the tubular body member 16. Threads 20 are formed on tubular T member 18 whereby suitable plumbing connections may be affixed to form a closed system.

Internal threads 22 are formed substantially throughout the interior length of tubular body member 16. Threads 24 are provided on the upper exterior portion of tubular body member 16 adaptable to receive a pipe cap so that the interior of tubular body member 16 may be sealed following the tapping process.

A punch member 26, of a basic cylindrical configuration having external threads 28 formed thereon is adaptable for threadably positioning within tubular body member 16. The external threads 28 of punch member 26 engage the internal threads 22 of tubular body member 16, so that the position of punch member 26 within tubular body member 16 may be altered by rotation of punch member 26.

Formed in the upper end of punch member 26 is a hexagonal socket 30 adaptable to receive a hexagonal shaped tool to facilitate the rotation of punch member 26. An integrally formed punch portion 32 is connected to the punch member 26 by an integral intermediate tapered portion 34. A punching face 36 terminates the punch portion 32 of the punch member 26. An essential novel feature of this invention is the configuration of the punching face 36.

The design of punching face 36 consists of a number of substantially equal area flat faces 38 terminating in a point 40. According to the principles of this invention the number of flat faces 38 may vary from three, as shown in FIGURE 5, to six, shown in FIGURE 8. Embodiments wherein the number of flat faces is four is shown in FIGURE 6 and wherein the number of flat faces is five is shown in FIGURE 7. The intersection of flat faces 38 in each embodiment forms cutting edges 42. There will always be the same number of cutting edges 42 as there are flat faces 38. Cutting edges 42 all meet at a common point 40. Point 40 coincides substantially with the axis of cylindrical punch member 26.

Referring to FIGURE 2 the means whereby a hole is formed in the pipe 10 by rotation of punch member 26 is best shown. As punch member 26 is rotated external threads 28 of punch member 26 acting against the internal threads 22 of the tubular body member 26 forces punching face 36 into pipe 10 with great pressure. The combination of the pressure with which the punching face 38 engages the pipe 10 and the rotary movement of the punching face 38 against the pipe 10 results in a displacement of the metal of pipe 10 both upwardly and downwardly. In FIGURE 2 it is shown that as punch portion 32 is forced through pipe 10 displaced metal accumulates on the exterior of the pipe indicated at A and on the interior of the pipe indicated at B. The displaced metal A and B is not in the form of cuttings, chips or slugs, but instead the displaced metal continues to adhere to and form a portion of pipe 10. The displaced metal A and B is formed by the concentration of pressure in a continuously moving area on the cutting edges 42 of the punching face 36. The configuration of punch face 36 does not result in the formation of cuttings as the punch portion 32 protrudes through pipe 10 since there are no sharp or acute angle cutting surfaces. No slug is formed since the punch face terminates in a point 40 which protrudes through the pipe 10 forcing the metal upward, downward and outward in the process of forming a hole in the pipe.

As stated previously, the number of flat faces 38 forming punching face 36 may vary from three to six, as shown in FIGURE 5 through FIGURE 8. The configuration of FIGURE 5 wherein three flat faces 38 are provided is deemed optimum. Configurations having more than six flat faces 38 may be utilized but the greater the number of flat faces 38 the more the punching face 36 approaches roundness, and greater is the area by which force is concentrated on pipe 10. For these reasons it has been determined that the configuration of FIGURE 5 having three flat faces 38 is optimum.

Referring to FIGURE 9, a cross-section of the punching tip 34 taken along the line 9—9 of FIGURE 5 is shown. It has been determined that the angle that flat faces 38 have relative to a line drawn through tip 40 and perpendicular to the axis of punch portion 32 to achieve best results ranges from 15° to 60°. The optimum angle of flat faces 38 is 45°. It is important to note that this angle is measured with respect to flat faces 38 and not with respect to cutting edges 42 where two flat faces 38 intersect.

The application of the principles of this invention result in a novel means of forming a hole in a pipe by a self-punching T fitting which has many advantages over any of the other known and existing means of punching holes in pipes as applied to self-punching T fittings. The ability to provide a self-punching T fitting capable of punching a hole in a pipe without the disadvantages of either creating metallic cuttings or metal slugs means that one of the greatest deterrents to the wide spread commercial adaptation of self-punching T fittings has been eliminated. If metallic scales or shavings are produced by the punch face 36 of this invention they are usually very fine and thin and therefore subject to rapid decomposition so that the chance of interference with the gas flow in pipe 10 is substantially eliminated.

The diameter of punch portion 32 of punch member 26 will vary, of course, according to the size of pipe 10 being punched, the size of tubular body member 16, and so forth. In practice it has been determined that the optimum diameter for normal usage in tapping typical gas lines wherein punching face 36 functions most optimumly is within a range of approximately three-sixteenths ($3/16$)

of an inch to one-half (½) of an inch. A diameter of one-fourth (¼) of an inch is preferred.

Referring to FIGURE 3 and FIGURE 4 an additional improvement in self-punching T fittings is shown. As has been previously described, after the self-punching T fitting 12 has been welded onto a pipe 10 and as the punching member 26 is rotated to form a hole in the pipe 10, a great danger exists because of the possibility of the escape of gas past threads 28 and out of the top of the tubular body portion 16. This is especially dangerous when the T fitting 12 is used to provide a connection to a high pressure gas pipe. The escaping gas presents a great hazard in that a spark may ignite the gas causing an explosion or fire. A novel means of providing against the escape of gas is disclosed in FIGURE 3. In order to seal the threads 28 of punch member 26 with the internal threads 22 of the tubular body portion 16 a plastic gasket element 44 is molded onto a recessed area or groove 46 formed in the periphery of the punching member 26. The material forming plastic gasket element 44 may be any resilient moldable material such as rubber, nylon, or any of the many moldable plastic materials.

The plastic gasket element 44 preferably has a length longer than the diameter of opening 48 in the tubular T member 18. In this manner, after the hole 50 has been formed in pipe 10, and as the operator backs off the punch member 26 by rotation in the opposite direction so that communication exists between the interior of pipe 10 and tubular opening 48 in tubular T member 18, gas will be prevented from escaping past threads 28 since at all times the plastic gasket element 44 is sufficiently wide to either seal completely at the bottom or the top of the tubular T member 18.

An alternate embodiment of this improvement is shown in FIGURE 4. Rather than providing a single molded plastic gasket element 44 upper and lower gasket elements 44A and 44B are provided. By providing both an upper and lower gasket element 44A and 44B the width of the gasket elements may be materially reduced. The distance between upper gasket element 44A and lower gasket element 44B should be greater than the diameter of tubular opening 48 as previously described with reference to FIGURE 3 to prevent the possibility of gas circumventing one of the plastic gasket elements 44A or 44B as the punch member 26 is backed out of engagement with hole 50.

The provision of plastic gasket elements 44, in addition to the safety feature of preventing the escape of gas out of the top of tubular body member 16, has the additional advantage of improving the valving action of the punch member 26. After the formation of hole 50 in pipe 10 the self-punching T fitting 12 of this invention may be utilized as a valve. A sealing action is of course available between punch portion 32 and hole 50, but if this is not sufficient to provide a leak proof seal, then the superior engagement between plastic gasket elements 44 and the interior threads 22, when punch member 26 is rotated so that gasket elements 44 are positioned between pipe 10 and tubular opening 48, will serve as a means of sealing the flow between pipe 10 and tubular T member 18.

In the embodiment of both FIGURE 3 and FIGURE 4 the gasket elements 44 are formed with threads conforming with the threads 28 of the punch member 26. The threads on the gasket elements 44 are slightly larger in diameter than the threads 22 formed internally of body member 16 so that gasket members 44 exert compressive force against threads 22 to prevent leakage past punch member 26.

The plastic gasket elements 44, in practice, will have a nominal thickness of approximately one-eighth (⅛) inch and when used with a self-punching T fitting 12 having a three-eighths (⅜) inch internal diameter tubular T member 18 will have a length of approximately one-half (½) inch.

For purposes of clarity and simplicity this invention has been described as utilized to form T taps to gas lines. The principles of the invention are equally applicable to pipe lines utilized to transmit liquids.

The improvements as set forth in this invention serve to eliminate the basic difficulty to the widespread commercial application of self-punching T fittings as a means of providing connections with pipelines.

Although this invention has been described in a certain degree of particularity, it is manifested that many changes may be made in the details of construction and the arrangement of components without departing from the spirit and the scope of this disclosure.

I claim:

1. A self-punching T fitting of the type described adaptable for affixing to a pipe whereby fluid communication may be provided with said pipe, comprising, in combination: a tubular body member adaptable for affixing, as by welding, at one end thereof to the exterior surface of said pipe whereby said body member extends substantially radially therefrom, said tubular body member having threads formed substantially the full length of the internal surface thereof; a tubular T member engaging and integrally formed with said body member intermediate the ends thereof whereby the interior of said tubular T member communicates with the interior of said body member; and a cylindrical punching member having threads formed thereon adaptable to screwably engage said internal threads of said body member, said punch member having a reduced concentric cylindrical end portion, said reduced end portion terminating in a punching face, said punching face defined by at least three and not more than six flat face areas, each of said flat face areas formed at an angle with respect to a plane drawn perpendicular to the axis of said punching member, said flat face areas intersecting each other to form a point coinciding with the axis of said cylindrical punch member, and said punch member having means at the end opposite said punching face adaptable to receive a tool whereby said punch member may be rotated in one direction to engage said punching face with said pipe to displace a portion of the metal of said pipe to form a hole therein and whereby said punching member may be subsequently rotated in the opposite direction to displace said punching member within said body member away from said hole to provide fluid communication between said pipe and said tubular T member.

2. A self-punching T fitting according to claim 1 wherein said angle said flat face areas of said punching face form with respect to a plane drawn perpendicular to the axis of said punching member is from 15° to 60°.

References Cited in the file of this patent

UNITED STATES PATENTS

| 2,260,288 | Black | Oct. 28, 1941 |
| 2,360,733 | Smith | Oct. 17, 1944 |
| 2,736,335 | Webber | Feb. 28, 1956 |
| 2,950,637 | Merrill | Aug. 30, 1960 |

FOREIGN PATENTS

| 670,991 | France | of 1929 |